US007937753B2

(12) United States Patent
Hodges et al.

(10) Patent No.: US 7,937,753 B2
(45) Date of Patent: May 3, 2011

(54) METHOD AND APPARATUS FOR DISTRIBUTED INFORMATION MANAGEMENT

(75) Inventors: Eugene W. Hodges, Holly Springs, NC (US); Joseph Christie, Cary, NC (US)

(73) Assignee: Microsoft Corporation, Redmond, WA (US)

( * ) Notice: Subject to any disclaimer, the term of this patent is extended or adjusted under 35 U.S.C. 154(b) by 1188 days.

(21) Appl. No.: 11/090,681

(22) Filed: Mar. 25, 2005

(65) Prior Publication Data

US 2006/0218623 A1    Sep. 28, 2006

(51) Int. Cl.
*H04L 29/06* (2006.01)
(52) U.S. Cl. .......................... 726/12; 713/189
(58) Field of Classification Search .................. 713/189; 726/12
See application file for complete search history.

(56) References Cited

U.S. PATENT DOCUMENTS

| | | | |
|---|---|---|---|
| 4,809,170 A * | 2/1989 | Leblang et al. | 717/122 |
| 2002/0073167 A1* | 6/2002 | Powell et al. | 709/217 |
| 2003/0093694 A1 | 5/2003 | Medvinsky et al. | |
| 2005/0039034 A1* | 2/2005 | Doyle et al. | 713/193 |
| 2005/0144242 A1* | 6/2005 | Marston et al. | 709/206 |
| 2006/0036580 A1* | 2/2006 | Stata et al. | 707/3 |
| 2009/0013083 A9* | 1/2009 | Garcia-Luna-Aceves et al. | 709/229 |
| 2009/0013399 A1* | 1/2009 | Cottrell et al. | 726/12 |

OTHER PUBLICATIONS

European Search Report from corresponding European Application No. 06111463 dated Jun. 13, 2006.
Zhang et al., "A Flexible Content protection System for Media-on-Demand," Proceedings of the IEEE Fourth International Symposium on Multimedia Software Engineering, Dec. 11-13, 2002, pp. 272-277.
Open Mobile Alliance, Digital Rights Management Version 1.0, Version-Sep. 5, 2002, pp. 1-21.

* cited by examiner

*Primary Examiner* — Christopher J Brown
(74) *Attorney, Agent, or Firm* — Wolf, Greenfield & Sacks, P.C.

(57) ABSTRACT

The information management system such as might be used for a source code management system. The information management system is distributed throughout an enterprise and is operated to allow secure communications with remote sites connected to a central site over an unsecured network. A secure channel is created through the unsecured network to transmit encryption and identifier information for one or more artifacts. This information is used to access an artifact from a remote site and decrypt it. Because artifacts, though encrypted, retain an identifiable form, they may be cached throughout the information management system. The ability to cache artifacts significantly reduces the bandwidth required for operating the information management system from remote sites.

20 Claims, 3 Drawing Sheets

METHOD AND APPARATUS FOR DISTRIBUTED INFORMATION MANAGEMENT

BACKGROUND OF INVENTION

1. Field of Invention

This invention relates generally to information management systems and more particularly to distributed information management systems.

2. Discussion of Related Art

Information management systems are widely used. Such systems often include a database that stores "artifacts." An artifact is a collection of data in an organized form that is manipulated by the information management system. Artifacts are often computer files. A common type of information management system is a version control system, such as may be used to manage files of computer source code in an enterprise developing software.

Information management systems are often networked so that multiple people within an enterprise may work with the artifacts. In the example of a source code management system, program developers, project managers, test engineers and others within the enterprise may all access the source code files. The files may be stored in a central database. To facilitate use of the files throughout the enterprise, information management systems often include a server linked to the database. The server is connected to a network, allowing workstations for the individual users of the information in the information management system to retrieve copies of the artifacts from the database. As users require artifacts, their workstations send requests to the server, which then provides copies of the artifacts over the network.

A networked architecture for an information management system may be used even when the enterprise has multiple work sites distributed over a relatively wide geographic area. A wide area network, including possibly the Internet, allows individual workstations at distributed locations to communicate with a server that has access to the database of artifacts.

Where any part of the communication path between the client and the server is unsecured, a secure channel may be created over the network, even if the network is unsecured. The Internet is an example of an unsecured communication path. Examples of secure channels that may be created over an insecure network are a secure socket layer (SSL) connection or a virtual private network (VPN).

In a secure channel, the communication protocol is such that it is difficult for an unintended recipient to determine the content of information transmitted over the network, even if the transmissions are intercepted. For example, a device transmitting through a SSL channel encrypts information as the information is transmitted. The information may also be broken into pieces so that there is no readily detectable correlation to information being transmitted. As a result, an unintended recipient may not even be able to identify the portions of the transmissions that represent files or other logically related blocks of data, making efforts to "crack" an encryption mechanism more difficult.

A drawback of using a secure channel is the amount of time required by a user to download information over the secure channel and the overhead imposed in a client-server environment. SSL employs a unique asymmetric key pair for each user's session. A unique symmetric key is used for encryption of data as it is transmitted over the channel. Where information on a server is to be distributed to multiple clients, using SSL channels imposes a high overhead on the server. It would be desirable to provide an improved method and apparatus for an information management system such as may be operated by an enterprise with geographically disbursed sites interconnected by unsecured channels.

SUMMARY OF INVENTION

The invention relates to an information management system in which a computing device may receive information about an artifact over a secure channel. This information is used to retrieve and decrypt an encrypted version of the artifact over an unsecured channel.

In one aspect, the invention relates to a method of communicating between a server having access to a plurality of artifacts, and a client having access to a proxy server having a cache associated therewith, the cache storing copies of artifacts. The method comprises communicating a first request from the client to the server; communicating, in response to the request, from the server to the client encoded information about the artifact; generating, from the client to the proxy server, a second request using the encoded information; and when a copy of the artifact is stored in the cache, providing in response to the second request a copy of the artifact from the cache.

In a further aspect, the invention relates to a method of operating a computing device to access an artifact, the device coupled to a network through a secure and an unsecured channel may be formed. The method comprises: using the secure channel to receive information concerning an artifact; using the information concerning an artifact to use the unsecured channel to request a copy of the artifact; receiving the artifact in encrypted form; and using the information concerning the artifact to convert the artifact from the encrypted form to a decrypted form.

In a further aspect, the invention relates to a source code control system of the type having equipment at a first site, equipment at a second site and a network interconnecting equipment at the first site and equipment at the second site. The equipment at the first site comprises a memory storage device storing a plurality of versions of a plurality of source code files; a server comprising a computer-readable medium storing computer-executable instructions for encrypting a version of a source code file to create an encrypted artifact; communicating over the network the encrypted artifact; and communicating over the network encryption information concerning the encrypted artifact. The equipment at the second site comprises a client computer, the client computer comprising a computer-readable medium storing computer-executable instructions for obtaining the encryption information; receiving the encrypted artifact over the network; and using the encryption information to decrypt the encrypted artifact to generate the version of the source code file.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

An improved information management system is provided by allowing secure communications of artifacts over an unsecured channel. The artifacts are communicated in an encrypted form and may be stored in a proxy server local to the workstation receiving the artifacts. A secure channel is used to transmit a relatively small amount of information about each artifact. Such a system, may, for example, be used to connect a remote site of an enterprise to a central site using an unsecured channel such as the Internet. A source code management system is used herein as an example information management system.

Figure 1:
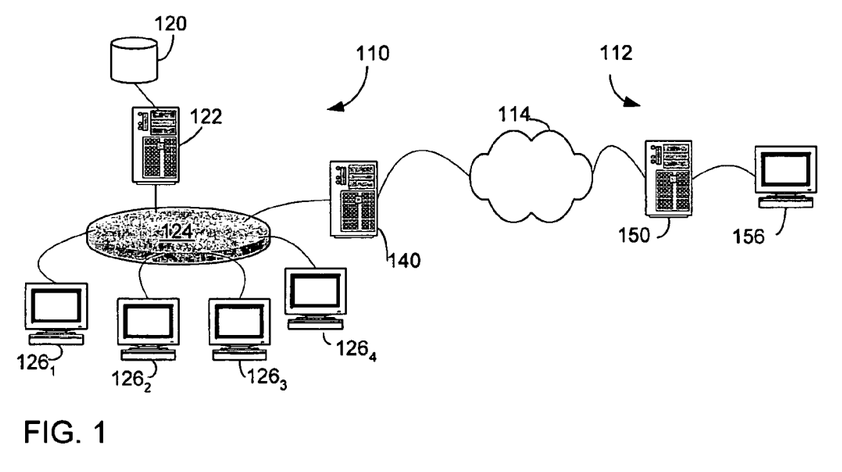
FIG. 1 is sketch illustrating the architecture of an information management system according to an embodiment of the invention.

FIG. 1 depicts an information management system according to one embodiment of the invention. The information management system includes a central site 110 and a remote site 112. The central site 110 and remote site 112 are connected through a network, which may be the Internet 114.

Central site 110 includes a database 120. Database 120 is formed from computer-readable and computer-writable storage media. It includes controllers that organize the storage and retrieval of artifacts. In the described embodiment, each artifact is a file containing source code that is part of a development project being performed by the enterprise that operates central site 110 and remote site 112. In this example, each file in database 120 is described by a file name, and multiple versions of each file may be stored in database 120. Database 120 may be a database as known in the art, but any suitable form of database may be used.

Central site 110 includes multiple client workstations $126_1$, $126_2$ ... $126_4$. In use, each client workstation may be used by a person within the enterprise managing central site 110 and remote site 112 to process artifacts from database 120. Each workstation may, for example, be used by a code developer who creates source code files that are stored in database 120. Alternatively, a client workstation may be used by a code tester who retrieves a source code file from a database 120 and tests it. Each client workstation may, for example, be a personal computer or similar computing device.

Central site 110 includes a server 122. Server 122 is connected to database 120. Server 122 is accessible to each of the client workstations $126_1$, $126_2$, $126_3$ and $126_4$ over wide area network 124. Server 122 may be a combination of hardware and software elements that receives communications from client workstations $126_1$, $126_2$ ... $126_4$ requesting that an artifact stored in database 120 be passed to the client workstation. Server 122 contains hardware and software elements that receive such requests and access database 120 to provide a copy of the requested artifact to the workstation. Server 122 may be a file server communicating using HTTP messages as is known in the art, but any suitable implementation may be used.

Remote site 112 includes one or more remote client workstations 156. Here, a single remote client workstation 156 is shown for simplicity, but the invention may be most useful when multiple client work stations access artifacts in database 120 from a remote sites. Remote client workstation 156 may be the same type of workstation as client workstations $126_1$ ... $126_4$ and may be used for the same purposes. Remote client workstation 156 should therefore have access to artifacts stored in database 120 similar to client workstations $126_1$ ... $126_4$. However, the information flow path between remote client workstation 156 and database 120 passes through the Internet 114, which is an unsecured network.

A secure channel may be formed between remote client workstation 156 and server 122 as is known in the art. However, the secure channel need not be used directly to transfer artifacts in database 120 to remote client workstation 156. To allow more rapid access to artifacts stored in database 120, a secure channel between remote client workstation 156 and a server at central site 110 is used to transmit a relatively small amount of information. This information is used to access and enable use of an encrypted artifact transmitted over an unsecured channel through Internet 114. The artifact may be encrypted outside of the protocol used to transmit information over the network, which can yield more efficient transmission of artifacts.

One way in which the efficiency of transmissions of artifacts over an unsecured channel is increased that the encrypted artifacts may be cached, even in unsecured locations. Any suitable hardware and software may be used to cache artifacts. In the pictured embodiment, remote site 112 includes a proxy server 150, which is one example of a device that may cache artifacts. Proxy server 150 may be a proxy server as is known in the art. Proxy server 150 is connected between remote client 156 and Internet 114. As remote client workstation 156 requests artifacts, such as files or web pages, to be downloaded over Internet 114, proxy server 150 may receive and store copies of the artifacts in computer-readable and computer-writable memory associated with proxy server 150. The stored information forms a cache of artifacts. Subsequent requests for artifacts can be fulfilled from the cache, reducing traffic over the network.

As remote client workstation 156 generates further requests for information, those requests may pass first to proxy server 150. If proxy server 150 has stored in its cache the artifact requested, proxy server 150 provides the artifact to remote client workstation 156 from its cache. The request is not then transmitted to the Internet 114. Providing information from a cache associated with proxy server 150 can increase the speed at which artifacts can be provided to remote client workstation 156. The speed increase is greatest when the same artifact is accessed frequently, whether the access is made by one remote client workstation or several different remote client workstations. In a source code management system, artifacts containing portions of source code currently under development are often accessed frequently.

Traditionally, the Internet 114 is not regarded as providing a secure channel. Because proxy servers normally store information obtained over an unsecured channel, proxy servers are often not secure. To provide secure communications between remote client workstation 156 and server 122, artifacts to be transmitted are encrypted. Where proxy server 150 is not secure, artifacts may be cached in proxy server 150 in encrypted form.

Further efficiencies may be obtained by caching encrypted artifacts at the central site 110. In the illustrated embodiment, central site 110 includes a reverse proxy server 140 that also stores copies of encrypted artifacts. Reverse proxy server 140 is an example of a device that may be used to cache artifacts. Reverse proxy server 140 may be a proxy server as known in the art, including a cache operating according to policies that may be as known in the art. Reverse proxy server 140 may encrypt artifacts or may receive artifacts in an encrypted form.

In the pictured embodiment, as requests for artifacts are transmitted over Internet 114, they arrive at reverse proxy server 140. If reverse proxy server 140 stores in its cache an encrypted version of the requested artifact, it may provide a copy of the encrypted artifact. When reverse proxy server 140 does not already store in its cache an encrypted copy of the artifact, it may request the artifact from server 122. Server 122 may then provide an encrypted artifact over wide area network 124. Reverse proxy server 140 may then store the encrypted artifact in its cache and transmit the encrypted artifact over Internet 114.

Figure 2A:
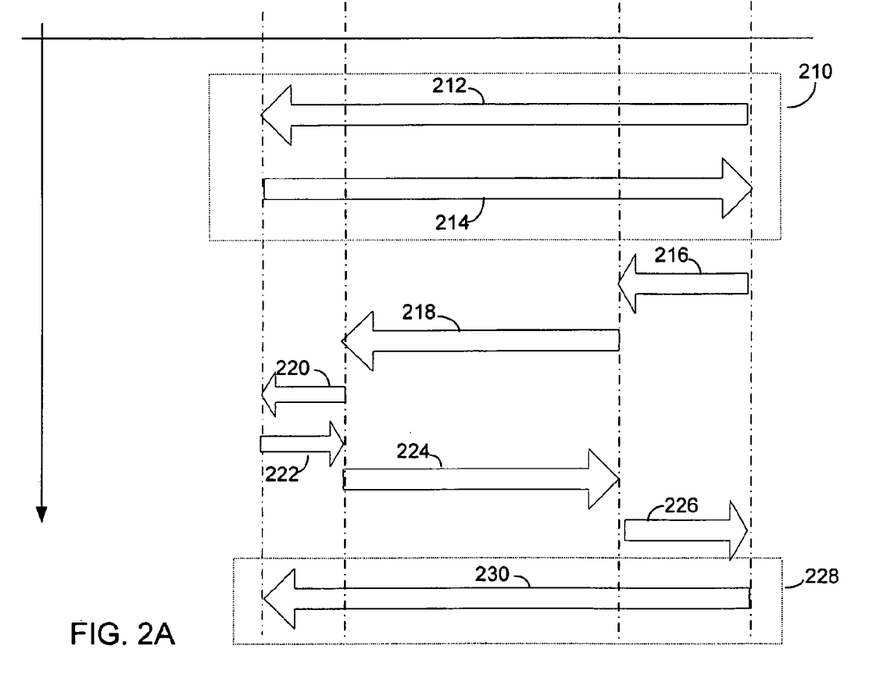
FIG. 2A is a sketch illustrating communications between equipment illustrated in the information management system of FIG. 1.

FIG. 2A illustrates a sequence of communications between the elements of the information management system pictured in FIG. 1. The interchange begins with remote client workstation 156 establishing a secure channel to server 122. In the embodiment of FIG. 2A communication is initiated in a secure channel 210. Secure channel 210 may be formed using traditional secure protocols, whether now known or hereafter developed. In the described embodiment, secure channel 210 is created using a secure socket layer (SSL) protocol. Because request 212 is sent over a secure channel to server 122, neither proxy server 150 nor reverse proxy server 140 has access to the contents of the request. Request 212 goes directly to server 122 in this embodiment.

Request 112 identifies one or more artifacts to be provided to remote client workstation 156. In this embodiment, each artifact is identified by its file name. Where database 120 stores files as part of a version control system, the file name may identify a specific version of a file. Server 122 at central site 110 responds to request 212 with bundle 214.

Bundle 214 is also transmitted over the secure channel 210. Bundle 214 provides information allowing remote client workstation 156 to obtain and utilize a requested artifact. For this embodiment, bundle 214 includes an identifier for an encrypted version of the artifact. Bundle 214 includes an encryption key that may be used to decrypt an encrypted version of the artifact. Also, bundle 214 may include an error detecting code, such as a hash code, prepared for the requested artifact.

In this embodiment, the identifier is a code assigned to the artifact. Each artifact in database 120 has a unique identifier assigned by server 122. Preferably, the identifier does not reveal information about the function or structure of the artifact. In contrast, file names are often selected to be descriptive of the function of the artifact. In the described embodiment, the identifier is used to refer to the artifact in communications transmitted over unsecured channels. Using a non-descriptive identifier instead of a file name may increase security. Unauthorized recipients of transmissions over an unsecured channel receive reduced information that can be used to "crack" the encryption of an artifact. Each identifier may be assigned in any suitable way. For example, identifiers may be randomly assigned or may be assigned in the order in which artifacts are added to database 120. Where database 120 stores multiple versions of files, each version will have its own identifier.

The encryption key associated with bundle 214 is a key that may be used to decrypt an encrypted version of the artifact. Many forms of encryption are known and any suitable form of encryption may be used. In the described embodiment a symmetrical encryption algorithm is used such that the key used to encrypt an artifact is the same key that is used to decrypt the artifact. In the described embodiment, an encryption algorithm having keys with at least 64 bit is used. Examples of suitable algorithms are the AES 128 and AES 256 encryption algorithms. Each artifact may have a unique encryption key. Where database 120 stores multiple versions of files, each version may have its own encryption key.

The error checking code associated with bundle 214 provides a further measure of security. The error checking code is generated by performing an operation on the artifact at central site 110. The value generated for the error checking code depends on the contents of the file representing the artifact. Remote client workstation 156 may perform the same operation on the artifact it receives. If the error checking code associated with the bundle 214 does not match the error checking code generated by the remote client workstation 156, remote client workstation 156 may identify that the file was corrupted or altered as the result of tampering. In the described embodiment, the error checking code is generated through a hashing algorithm. One example of a hashing algorithm that may be used is the SHA1 hashing algorithm, but any suitable method of generating an error checking code may be used.

Once the bundle 214 is received at remote client workstation 156, remote client workstation 156 may generate a request 216 for a copy of the encrypted artifact. In the example embodiment, the identifier provided as part of the bundle 214 serves as a page address for the artifact. In the example where remote site 112 is connected to central site 110 over the Internet 114, communications may be in the form of HTTP messages as are traditionally used over the Internet. Request 216 may be an HTTP GET request. In this example, the identifier transmitted in bundle 214 may be a portion of the URL for the file containing the artifact. Accordingly, request 216 may be in the form of HTTP://server/ identifier. The portion of the URL represented as HTTP:// server identifies the web address for server 122. The portion of the URL identified as "identifier" represents a particular file accessible to server 122, such as a file stored in database 120.

When the information management system pictured in FIG. 1 begins operation, proxy server 150 contains no artifacts in its cache. This scenario is depicted in FIG. 2A. Accordingly, request 216 passes through proxy server 150 as request 218.

Request 218 passes over Internet 114 to reverse proxy serve 140. As the information management server of FIG. 1 begins operations, reverse proxy server 140 also contains no information concerning artifacts. Request 218 passes through reverse proxy server 140 as request 220.

Request 220 passes over wide area network 124 to server 122. Server 122 uses the identifier in the request transmitted by remote client work station 156 to identify a particular artifact in database 120. Server 122 retrieves the artifact from database 120. The artifact may be encrypted in any suitable hardware programmed to execute an encryption algorithm. In this scenario, server 122 encrypts the artifact using the key transmitted with bundle 214. It is not, however, necessary that encryption be performed by server 122. As an example of one alternative, database 120 may store an encrypted version of each artifact and server 122 may simply retrieve an encrypted version of the requested artifact.

Regardless of how the artifact is stored or encrypted, server 122 prepares a response 222 to the GET request initiated by remote client workstation 156. In the example where communication between remote client workstation 156 and server 122 is over Internet 114 using an HTTP protocol, the encrypted artifact is included in reply 222 according to formatting prescribed by the HTTP protocol.

Reply 222 passes first to reverse proxy server 140. Reverse proxy server 140 may cache a copy of the encrypted artifact included in reply 222 according to its policies. The encrypted artifact may be stored in the cache associated with reverse proxy server 140 indexed by the URL used to request the artifact from server 122. Any subsequent request for the same artifact will use the same URL in a get request. Accordingly, while an unencrypted artifact is cached in reverse proxy server 140, reverse proxy server 140 may identify and respond to subsequent requests for that artifact.

Reply 224 containing the encrypted artifact is sent from reverse proxy server 140 over Internet 114 to proxy 150. Proxy 150 may also store the encrypted artifact in its cache according to its policies. The encrypted artifact may also be stored in the cache associated with proxy server 150 also indexed by the URL used to request the artifact. If remote client workstation 156 subsequently requests a copy of the same artifact while stored in the cache associated with proxy server 150, proxy server 150 may respond by providing an encrypted copy of the artifact from its cache.

The encrypted artifact is sent in reply 226 from proxy server 150 to remote client workstation 156. Remote client workstation 156 may be programmed with decryption software that uses the encryption key included in bundle 214. The copy of the encrypted artifact included in reply 226 may therefore be decrypted at remote client workstation 156. The error checking code transmitted in bundle 214 may then be applied to the decrypted copy of the artifact to verify proper transmission of the artifact.

Once the software programs executing on remote client workstation 156 have determined that remote client workstation 156 has received a valid copy of the requested artifact, acknowledgement 230 may be sent. In this embodiment, acknowledgement 230 is transmitted over a secure channel 228. However, any suitable means to communicate an acknowledgement may be used.

Acknowledgement 230 may be used by server 122 to reduce the number of artifacts communicated to remote client workstation 156. For example, if remote client workstation 156 requests a related group of files, information from previous acknowledgements may be used by server 122 to determine that remote client workstation 156 has already been provided with a subset of the files in the group. Accordingly, server 122 may determine that an appropriate response to a request for a group of files requires sending less than all of the files in the group. However, acknowledgement 230 may not be included in all embodiments.

Figure 2B:
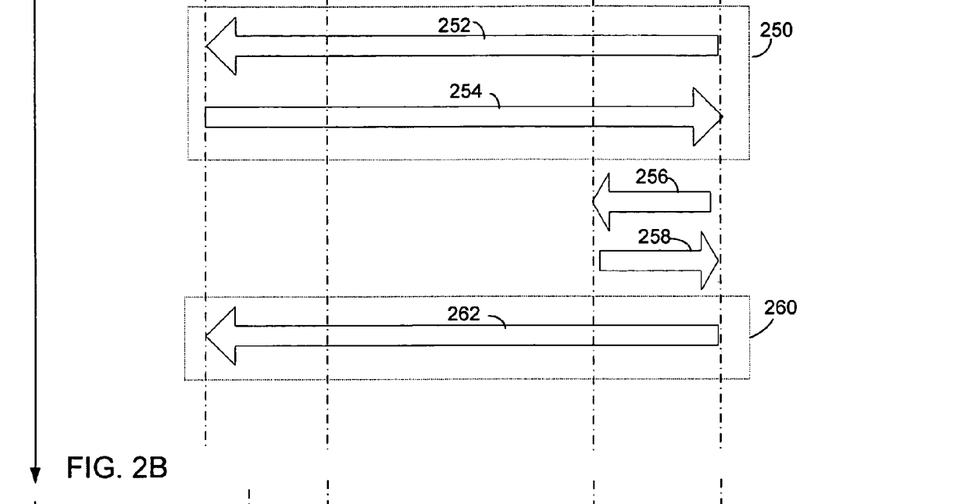
FIG. 2B is a sketch illustrating communications between equipment in the information management system of FIG. 1 according to an alternative operating state.

FIG. 2B illustrates an alternative exchange of information that may occur. As with the exchange of information illustrated in FIG. 2A, the interaction begins with a request 252 sent by remote client workstation 156. The request 252 is transmitted over a secure channel 250. Server 122 responds to request 252 with a bundle 254. Bundle 254 may contain an identifier for the file or files identified in request 252. Bundle 254 may also include an encryption key and an error checking code associated for each requested file. This information is returned to remote client workstation 156 over secure channel 250.

Remote client workstation 156 uses the identifiers contained in bundle 254 to issue a request 256 for the artifacts over an unsecured channel. Request 256 passes to proxy server 150. In the interchange illustrated by FIG. 2B, proxy server 150 has the requested artifact cached. The copy of the artifact may have been cached as a result of a previous interaction with remote client workstation 156 or any other workstation at remote site 112 connected through proxy server 150.

Proxy server 150 provides the requested artifact in an encrypted form without making a request to server 122. Proxy server 150 generates reply 258 containing a copy of the artifact in an encrypted form.

As discussed above in connection with FIG. 2A, remote client workstation 156 uses the encryption key included in bundle 254 to decrypt the artifact. Remote client workstation 156 may then apply the error checking code included in bundle 254 to verify that it has correctly received an uncorrupted copy of the requested artifact. In response, remote client workstation 156 may generate an acknowledgement 262. In this example, this acknowledgement 262 is sent to server 122 using a secure channel 260. In this way, even though server 122 did not directly supply a copy of a requested artifact to remote client workstation 156, server 122 may ascertain that remote client workstation 156 has a copy of the requested artifact.

This scenario illustrated in FIG. 2B may be typical of interchanges that occur when remote site 112 is a development office of a larger enterprise. Remote site 112 may include multiple developers all accessing the latest version of source code files under development for a specific product. Accordingly, each developer may use a remote client workstation such as remote client workstation 156 that is loaded with copies of each of the source files every day. By using an unsecured protocol, such as HTTP, to transmit files, proxy server 150 may identify specific files as they are transmitted to remote client workstations and cache copies of them. Even if proxy server 150 is an unsecured server, unauthorized access to the artifacts does not reveal information about the artifacts because they are encrypted. But because proxy server 150 may identify artifacts as they are being transmitted, it may cache them and respond to subsequent requests for the artifacts. In this way, the amount of information transmitted over Internet 114, or any other connection between remote site 112 and central site 110 may be significantly reduced.

Figure 2C:
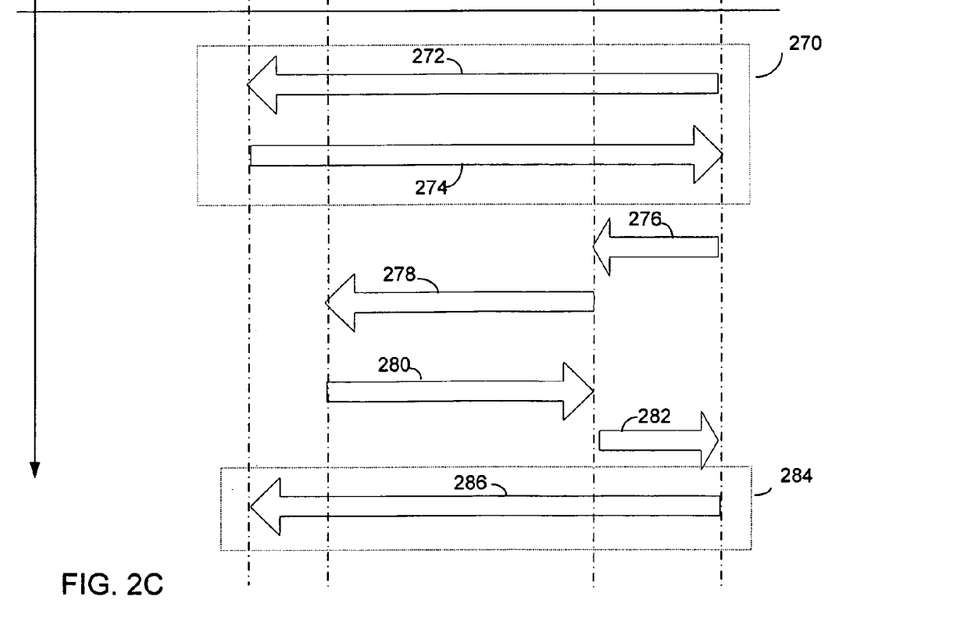
FIG. 2C is a sketch illustrating communications between equipment in the information management system of FIG. 1 according to an alternative operating state.

FIG. 2C shows an alternative transaction that may occur in response to a request for an artifact sent from remote client workstation 156. In this illustration, request 272 is sent from remote client workstation 156. Request 272 is sent over a secure channel 270 that may be formed through Internet 114. Request 272 is directed to server 122 and identifies the artifact or artifacts to be provided to remote client workstation 156.

Server 122 responds to request 272 by sending a bundle 274. Bundle 274 includes an identifier by which remote client workstation 156 may form a request for the appropriate artifact. Bundle 274 may also includes an encryption key and other information related to the artifact, such as an error checking code.

Remote client workstation 156 uses the information about the artifact contained in bundle 274 to generate request 276. Request 276 uses the identifier in bundle 274 to format a request for the artifact. Request 276 is here shown to pass to proxy server 150.

In this example, proxy server 150 does not have a copy of the artifact requested in its cache. Accordingly, a request 278 is generated from proxy server 150. Request 278 passes through Internet 114 to reverse proxy server 140.

In the example illustrated in FIG. 2C, remote proxy server 140 has stored a copy of the requested artifact in its cache. Accordingly, reverse proxy server 140 generates response 280 in response to request 278. Response 280 includes a copy of the requested artifact. The artifact may be transmitted in any suitable protocol, but in the embodiments described herein, the HTTP protocol is used. The artifact is transmitted in an encrypted form.

Reply 280 passes through Internet 114 to proxy server 150. Because proxy server 150 does not have a copy of the requested artifact stored in its cache, proxy server 150 stores a copy of the artifact in reply 280. The artifact may be stored in the cache associated with proxy server indexed by the URL used in request 276. The URL used in request 276 uses the identifier provided in bundle 274 rather than the actual file name.

Proxy server 150 forwards a copy of the encrypted artifact as part of reply 282. Remote client workstation 156 receives reply 282. Remote client workstation 156 may decrypt the encrypted copy of the artifact included with reply 282 by using the encryption key provided as part of bundle 274. Remote client workstation 156 may also apply the error checking code to the decrypted file to determine that the file had not been corrupted or tampered with while it is was transmitted over unsecured portions of the network connection between remote site 112 and central site 110.

Remote client workstation 156 may then send an acknowledgement 286 to server 122. In this example, acknowledgement 286 is transmitted over a secure channel 284.

Though proxy server 150 and reverse proxy server 140 are not required, FIG. 2C illustrates a benefit of including a reverse proxy server 140 as part of the information management system in an enterprise. Reverse proxy server 140 reduces the amount of information transmitted over wide area network 124. It also reduces the amount of time server 122 spends encrypting the artifacts from database 120.

Figure 3:
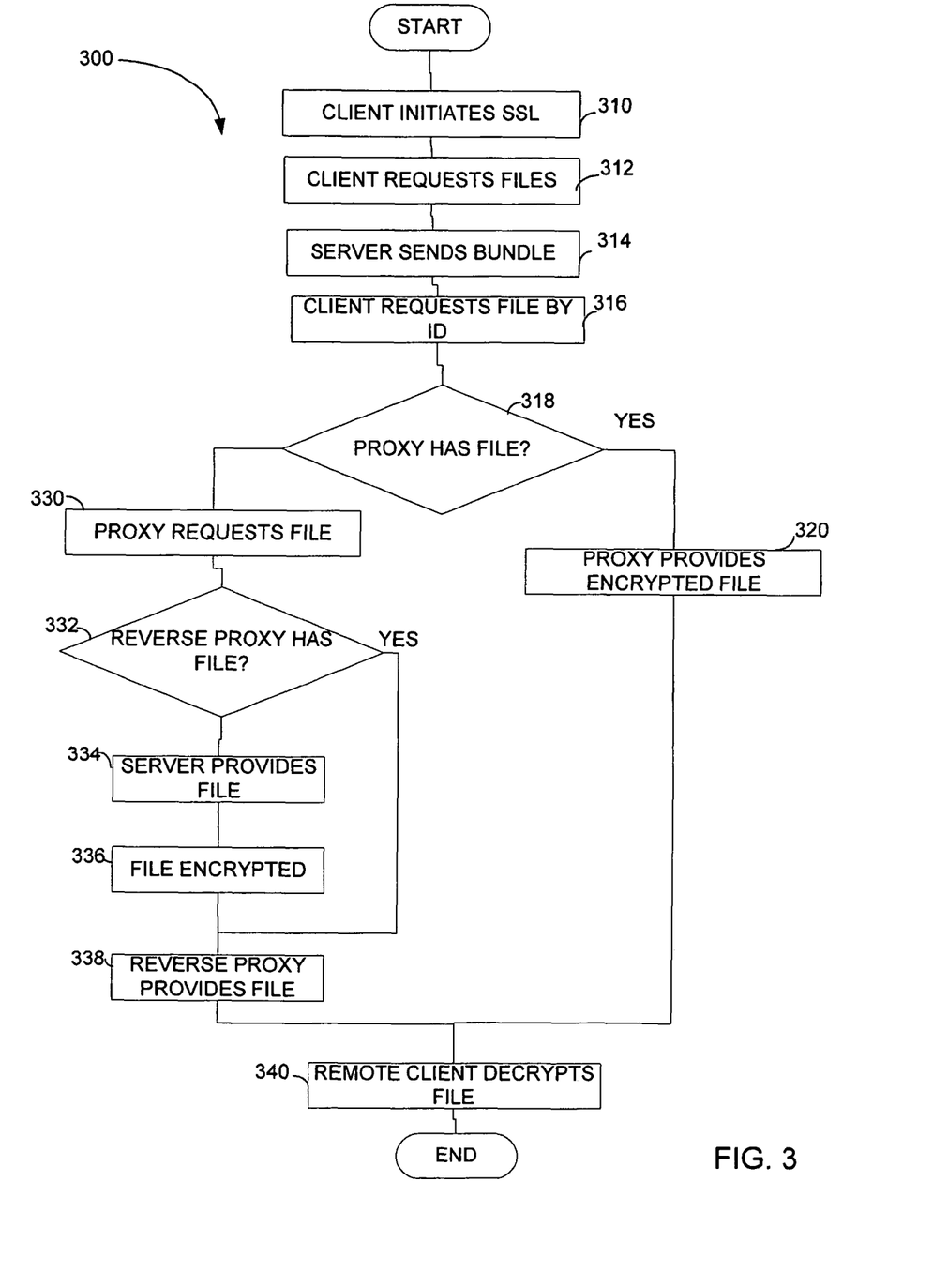
FIG. 3 is a flow chart depicting processing of information in an information management system according to the invention.

FIG. 3 illustrates a process by which an information management system may operate. The process beings at block 310 where a client initiates a secure connection with a server. The client may be a remote client workstation such as 156 pictured in FIG. 1. However, the same process may be employed with clients such as $126_1$, $126_2$, . . . $126_4$ located at a central site.

At block 312, the client requests one or more files from a server. The request sent at block 312 may identify one or more files. Because the request is sent over a secure channel, the request may identify each file by name or in any identification format, even if it reveals information about the file that is preferable to be retained secure within an enterprise. Any suitable format may be employed to request one or multiple files. For example, a request for multiple files may be formatted as a series of requests for individual files. However, any suitable format may be employed.

At block 314, the server responds with a bundle providing information concerning the requested files. The bundle includes information required to access the files in a secure way over an unsecured channel. In this example, the bundle includes for each file an identifier that may be used to form a network address from which to request the file. The bundle also includes for each file an encryption key. Preferably, the encryption key is different for each of the files. Using a separate encryption key for each file ensures that, even if one encryption key is compromised, only a relatively small percentage of the total information stored in the information management system is compromised. The bundle may additionally include other information about the requested file. In the examples described above, the additional information included an error checking code so that errors in transmission or tampering with the file can be identified. Other possible information that may be included in a bundle may be the size of the file, the date it was stored in database 120, or other information useful to a client requesting a file. If the bundle provides information on multiple files, the information may be provided in any suitable format. For example, the information can be provided formatted as a stream of sets of data, with one set for each file.

At block 316, the client uses information provided with the bundle to request one or more files over the unsecured communication channel.

At decision block 318, a decision is made whether the file is available from a proxy server to which the client has access. If so, processing proceeds to block 320 where the proxy provides the file. The file is provided in encrypted form.

If at decision block 318 it is determined that the file is not available locally to the client, processing proceeds to block 330. At block 330, the proxy forwards the file request to a central location.

At decision block 322, a reverse proxy at the central location determines whether it has cached a copy of the requested file. If so, processing proceeds to block 338 where the reverse proxy provides the file.

Where the reverse proxy has not cached the file, processing proceeds to block 334. At block 334, the server managing the database retrieves a requested file. Encryption may be performed in any suitable computer processor, which may be server 122, but other servers or computers may be used to perform the encryption. At process block 336 the file is encrypted.

The process continues at block 338. Regardless of whether the reverse proxy server obtains the file from its cache or encrypts a version of the file provided by the server at the central location, at block 338 the reverse proxy server provides the file to the client.

Processing continues at block 340 once the file has been provided to the client. Processing proceeds to block 340 whether the encrypted file is provided by the reverse proxy or from the proxy at the site near the client. At block 340, the remote client decrypts the file. The decrypted file may then be provided to an application running on the remote client.

The process illustrated by FIG. 3 may be implemented in any suitable manner. For example, the software on the remote client workstation controlling interactions with the file management system may be implemented as software in the application layer of a protocol stack.

In embodiments where files are transferred using a standard protocol such as HTTP, proxy server and reverse proxy serve 140 may be traditional hardware and software elements such as are used for proxy servers in any now known or hereafter developed application. Likewise, server 122 and database 120 may be implemented using traditional server and database hardware and software access, whether now known or hereafter developed. The server 122 or reverse proxy server 140 may be programmed with software to encrypt files and provide bundles in response to requests issued by remote clients. Such software may, for example, be incorporated into a server at the central site or in any convenient hardware or software accessible to the central site. Such program may, for example, be incorporated into the application level of a protocol stack.

Various alternative embodiments are possible. For example, it is described that artifacts are requested over the unsecured network using a coded identifier, which can reduce the amount of information about any of the artifacts that is exposed in the unsecured network. Where using the name or other identifier for the artifact does not reveal an undesirable amount of information, it is not necessary that the request use a coded identifier.

As another example, it was described that decryption of encrypted files occurs at the remote client workstation. The decryption process may be performed in any suitable processor. Where unauthorized access to proxy server 150 is not a concern, proxy server 150 may perform the decryption and store decrypted copies of artifacts in its cache. Alternatively, a separate processor at remote site 112 may be used to perform the decryption of artifacts.

Likewise, the time and place at which encryption occurs may also be varied. For example, encrypted artifacts may be stored in database 120. In such an embodiment, server 122 may decrypt files before providing them to client workstations $126_1, \ldots 126_4$ or other processors connected to server 122 over a secure network. Alternatively, client workstations $126_1, \ldots 126_4$ may receive encrypted artifacts and decrypt them before use. Redistributing the processing load in this fashion may, for example, be desirable where the amount of information distributed to remote sites is large in comparison to the amount of information used at central site 110. In that regard, "central" and "remote" are terms indicating the nature of the network connections between the database storing artifacts and the processor that receives the artifacts for use. The database 120 need not be stored at a location that is central to the enterprise using the information management system.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Also, the timing and ordering of steps may be varied. For example, interactions illustrated by FIGS. 2A . . . 2C begin with the remote client issuing a request and receiving an identifier and encryption key relating to a particular artifact. It is possible that the identifier and encryption key for a single artifact may be changed. If so, it may be necessary for each remote client to request the identifier and encryption key each time it requires the file. However, it is possible that a client work station may store a copy of an identifier and encryption key for a file and generate requests such as 216, 256 or 276 using an encryption key it has obtained previously and stored.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of communicating between a server having access to a plurality of artifacts and a client having access to a proxy server, the proxy server having a cache associated therewith, the cache storing copies of artifacts, the method comprising:
    a) communicating, over a secure connection, a first request for an artifact from the client to the server;
    b) in response to the first request, receiving from the server, over the secure connection, information about the artifact, the information comprising encryption information for the artifact;
    c) generating a second request for the artifact using the information, the second request being a communication directed to the server and including an identifier for the server;
    d) transmitting from the client the second request over an unsecure connection; and
    e) when a copy of the artifact is stored in the cache of the proxy server, receiving in response to the second request, over the unsecure connection, a copy of the artifact from the cache.

2. The method of claim 1, additionally comprising receiving the copy of the artifact from the server, over the unsecure connection, when a copy of the artifact is not stored in the cache.

3. The method of claim 1, wherein receiving information about the artifact comprises receiving an encoded identifier for the artifact.

4. The method of claim 1, wherein:
    receiving the copy of the artifact from the cache comprises receiving an encrypted copy of the artifact.

5. The method of claim 4, additionally comprising decrypting the encrypted copy of the artifact using the encryption information.

6. The method of claim 1, wherein the secure connection comprises an SSL connection.

7. The method of claim 4, wherein the server is coupled to a second proxy server, the second proxy server having a second cache storing the encrypted copy of the artifact; and
wherein receiving an encrypted copy of the artifact over the unsecure connection comprises receiving the encrypted copy of the artifact from the second cache.

8. A method of operating a computing device to access an artifact, the device coupled to at least one network through which a secure channel and an unsecured channel may be formed, the secure channel being a first connection that performs encryption processing, prior to transmission, on input content to be transmitted over the first connection and the unsecured channel being a second connection that transmits input content over the second connection without performing encryption processing on the input content, the method comprising:
 a) communicating, over the secure channel, a first request for a first artifact, the first request including a first identifier for the first artifact;
 b) receiving, in response to the first request over the secure channel, information concerning the first artifact, the information concerning the first artifact comprising a second identifier for a second artifact and an encryption key with which the second artifact has been encrypted, the second artifact being an encrypted copy of the first artifact;
 c) using the second identifier for the second artifact to transmit from the client a second request for a copy of the second artifact, the second request being transmitted over the unsecured channel, the second request being a communication directed to the server and including an identifier for the server;
 d) when the encrypted copy of the artifact is stored in a cache of a proxy server, receiving from the cache a copy of the second artifact over the unsecured channel, the encryption used to encrypt the second artifact not being provided by the unsecured channel; and
 e) using the encryption key to convert the copy of the second artifact from an encrypted form to a decrypted form.

9. The method of claim 8, wherein the first artifact is a source code file.

10. The method of claim 9, wherein the first identifier is a version identifier identifying a version of the source code file maintained by a version control system.

11. The method of claim 8, wherein the information concerning the first artifact comprises an error detecting code.

12. The method of claim 8, wherein using a secure channel to receive information concerning the first artifact comprises using a secure channel to receive information concerning a plurality of artifacts.

13. The method of claim 8, additionally comprising sending a communication over the network indicating that the computing device received a copy of the second artifact.

14. A source code control system of the type having equipment at a first site, equipment at a second site and a network interconnecting the equipment at the first site and the equipment at the second site, wherein:
 a) the equipment at the first site comprises:
  i) a memory storage device storing a plurality of unencrypted versions of a plurality of source code files;
  ii) a server comprising a computer-readable medium storing computer-executable instructions for:
   A) encrypting a version of a source code file to create an encrypted artifact;
   B) communicating over the network, using an unsecure connection, the encrypted artifact;
   C) communicating over the network, using a secure connection, encryption information concerning the encrypted artifact; and
  iii) a second server connected between the server and the network and comprising computer-executable instructions for:
   A) receiving the encrypted artifact from the server when the encrypted artifact is communicated over the network from the server;
   B) storing the encrypted artifact in a cache; and
   C) in response to a request for the encrypted artifact received from the second site following the storing, responding to the future request, without passing the request to the server, by transmitting the encrypted artifact from the cache;
 b) the equipment at the second site comprises a client computer and a cache, the client computer comprising a computer-readable medium storing computer-executable instructions for:
  i) transmitting, over the secure connection, a first request for a source code file;
  ii) obtaining, over the secure connection, the encryption information, the encryption information including an identifier for an encrypted copy of the source code file;
  iii) transmitting a second request for an encrypted copy of the source code file, the second request being a communication directed to the server and including an identifier for the server;
  iv) receiving, over the unsecure connection, the encrypted artifact over the network; and
  v) using the encryption information to decrypt the encrypted artifact to generate the version of the source code file, and
 the cache comprising a plurality of encrypted versions of a second plurality of source code files, the second plurality of source code files being at least a subset of the plurality of source code files stored on the memory storage device of the first site.

15. The source code control system of claim 14, wherein the computer-readable medium of the server further comprises computer-executable instructions for encrypting each of a plurality of versions of a source code file with a different encryption key.

16. The source code control system of claim 14, wherein:
 a) the memory storage device stores each of the plurality of versions of a plurality of source code files in connection with a first type identifier;
 b) the computer-readable medium of the server further comprises computer-executable instructions for communicating over the network a second type identifier concerning the encrypted artifact; and
 c) the cache stores the plurality of encrypted source code files in connection with the second type identifier.

17. The source code control system of claim 15:
 a) additionally comprising a plurality of client computers each having a browser adapted for downloading pages over the network; and
 b) wherein the cache additionally stores computer-executable instructions for caching the pages downloaded over the network.

18. The source control system of claim 14, wherein the second site further comprises a second client computer, the second client computer comprising a second computer-readable medium storing computer-executable instructions for:
    i) establishing a second secure connection and a second unsecure connection;
    ii) obtaining, over the second secure connection, the encryption information;
    iii) receiving, over the second unsecure connection, the encrypted artifact over the network; and
    iv) using the encryption information to decrypt the encrypted artifact to generate the version of the source code file.

19. The method of claim 1, wherein the secure connection is a first connection that performs encryption processing, prior to transmission, on input content to be transmitted over the first connection, and
    the unsecure connection is a second connection transmits input content over the second connection without performing encryption processing on the input content.

20. The source code control system of claim 14, wherein the equipment at the second site is adapted to obtain the encryption information by receiving the encryption information in response to the first request for the source code file transmitted by the equipment at the second site.

* * * * *

UNITED STATES PATENT AND TRADEMARK OFFICE
CERTIFICATE OF CORRECTION

| | | |
|---|---|---|
| PATENT NO. | : 7,937,753 B2 | Page 1 of 1 |
| APPLICATION NO. | : 11/090681 | |
| DATED | : May 3, 2011 | |
| INVENTOR(S) | : Eugene W. Hodges et al. | |

It is certified that error appears in the above-identified patent and that said Letters Patent is hereby corrected as shown below:

In column 14, line 61, in Claim 17, delete "claim 15" and insert -- claim 14 --, therefor.

Signed and Sealed this
Nineteenth Day of July, 2011

David J. Kappos
*Director of the United States Patent and Trademark Office*